(12) United States Patent
Rankin

(10) Patent No.: US 7,020,252 B2
(45) Date of Patent: Mar. 28, 2006

(54) GROUP AUDIO MESSAGE BOARD

(75) Inventor: Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 544 days.

(21) Appl. No.: 09/961,996

(22) Filed: Sep. 24, 2001

(65) Prior Publication Data

US 2002/0037072 A1 Mar. 28, 2002

(30) Foreign Application Priority Data

Sep. 25, 2000 (GB) .................................. 0023423

(51) Int. Cl.
*H04M 1/64* (2006.01)

(52) U.S. Cl. .................... 379/88.27; 455/413; 704/270

(58) Field of Classification Search ............... 379/67.1, 379/88.02, 88.04, 88.13, 88.18, 88.23, 88.25; 455/412.1

See application file for complete search history.

(56) References Cited

U.S. PATENT DOCUMENTS

| | | | |
|---|---|---|---|
| 5,450,488 A * | 9/1995 | Pugaczewski et al. ... | 379/88.25 |
| 5,544,229 A * | 8/1996 | Creswell et al. ....... | 379/114.05 |
| 5,737,393 A | 4/1998 | Wolf ............................ | 379/67 |
| 5,796,807 A * | 8/1998 | Costello et al. .......... | 379/88.18 |
| 5,937,047 A | 8/1999 | Stabler ....................... | 379/201 |
| 5,999,208 A | 12/1999 | McNerney et al. ........... | 348/15 |
| 6,219,407 B1 * | 4/2001 | Kanevsky et al. ........ | 379/88.02 |
| 6,393,107 B1 * | 5/2002 | Ball et al. ................. | 379/88.13 |
| 6,442,243 B1 * | 8/2002 | Valco et al. ............... | 379/67.1 |
| 6,480,579 B1 * | 11/2002 | Hijii ........................ | 379/88.04 |
| 6,754,484 B1 * | 6/2004 | Hiltunen et al. .......... | 455/412.1 |

FOREIGN PATENT DOCUMENTS

EP 0781028 A2 6/1997

* cited by examiner

*Primary Examiner*—Fan Tsang
*Assistant Examiner*—Gerald Gauthier
(74) *Attorney, Agent, or Firm*—Larry Liberchuk

(57) ABSTRACT

A communications system is provided comprising a communal audio message recordal apparatus GAMB (10) with multiple users (12) enabled to record and access recorded messages. The recordal of each message includes capture and storage of at least one qualifying parameter pertaining to the access to the recordal means, for example the time/date or the location from which access occurred. The qualifying parameter is further checked (18) against a subsequent request for access by a user to previously recorded messages, with access only being granted to those messages having a matching qualifying parameter.

5 Claims, 2 Drawing Sheets

GROUP AUDIO MESSAGE BOARD

BACKBROUND OF THE INVENITON

1. Field of the Invention

The present invention relates to data storage and retrieval services offered to users of electronic equipment and especially, but not exclusively, to message recording and replay services for users of mobile communications devices such as portable telephones and suitably equipped PDA's (personal digital assistants).

2. Description of the Related Art

Recent years have seen a great increase in subscribers world-wide to the Internet, with particular perceived value in the ability and facilities that this can provide for interaction between widely separated users. In an analogous fashion, similar value pertains to mobile telephone networks and, through advances in technology and the addition of functionalities, both in terms of the devices themselves and support functionalities, cellular telephones have become personal, trusted devices. A result of this is that a mobile information society is developing, with personalized and localized services becoming increasingly more important.

With users typically being unable (or unwilling) to converse directly, messaging services are becoming particularly valued, where a central utility takes messages posted by users and makes them available to others. A close to real-time implementation is an Internet chat room, where posted messages are available almost instantly to other users. In the field of telecommunications, an example of a similarly close to real time service is given in European patent application EP-A-0 781 028 (AT&T) which describes a conference mailbox (CMB) system. The CMB is an answerphone system which multiple users have access to, to leave respective voice messages, with an optional extension to include real time conference telecommunications. The CMB is typically hosted by a telecommunications service provider, set up for a finite period of time and at the request of a user of the service, with any number of users being supported if authorized by the requesting user. Restrictions on access to the CMB may be by one or a sequence of passwords distributed by the requesting user or, where the system supports collect calls enabling participants to leave messages for free, limitation may be through acceptance of collect calls from a limited geographical area only.

While such message sharing systems undoubtedly provide a useful facility, if the message contents are to be meaningful or interesting to a user calling up (particularly for a popular service with many subscribers) some form of restriction or segregation must be applied if the user is not to be faced with hundreds or thousands of messages of little or no relevance that have been posted in response to similarly unrelated messages. The proliferation of separate Internet chat rooms for separate topics bears witness to the need for specialisation of, or restrictions on, content for messaging services.

SUMMARY OF THE INVENTION

It is accordingly an object of the present invention to provide a system and method whereby messages posted at a communal location by a first user and made available to other users will be relevant to those users.

In accordance with a first aspect of the present invention there is provided a communications system comprising communal audio message recordal apparatus comprising audio data recordal means coupled with a communications system configured to enable multiple users to access the recordal means and to record respective audio messages thereby, wherein the recordal of each message further comprises capture and storage of at least one qualifying parameter pertaining to the access to the recordal means, the apparatus further being configured to determine said qualifying parameter for a subsequent access to the recordal means by a user and to enable access by said user having a matching qualifying parameter to previously recorded messages, otherwise to is deny such access. With the recorded messages being classified according to qualifying parameter, and only released again when that parameter is matched, the need for handling large numbers of irrelevant messages for the user is considerably reduced. Furthermore, the need for access control mechanisms for the system is effectively cancelled (although systems such as password access may still be provided).

In addition to adding new messages, the system may also permit users to append comments to existing messages, such that chains of message and comment build up. Playback of stored messages need not be via the same device (or class of device) that recorded the message: for example, messages recorded by mobile telephone may subsequently be played back via a web PC or WAP telephone interface. Also, the system may permit an accumulated chain of messages and comment to be actively transmitted to a specified user (specified by the user appending to the chain) for example to the originator of the first message on which the chain depends.

The communications system may supply as qualifying parameter to the recordal means an indication of geographical location for a user recording a message, and for a user requesting playback of a message. Thus, users who have something in common in terms of a location where the users are calling from (e.g. a sports venue or night-club) or have at sometime in the recent past visited, can share experiences through communally accessible messages on a group audio message board.

The communications system may comprise a plurality of networked beacons through which users access said recordal means, with the geographical qualifying parameter comprising the identification of the beacon, or a group of associated beacons, through which the user accesses said recordal means.

As mentioned, a password access mechanism may be provided by operation of which the apparatus requires a user to input a predetermined password before either permitting recordal of a message, or permitting access to a recorded message. To assist the user, the apparatus is preferably configured to generate and supply, to a user seeking access to previously recorded messages, an audio or visual indicator for the messages available to the user.

Also in accordance with the present invention there is provided a portable communications device for use with an apparatus as recited above, the device being configured for communications via said communications system, and comprising the said means configured to determine said qualifying parameter and supply the same to the recordal means. The device may further comprise user operable input means for input of a password and/or it may further comprise display means operable to display said visual indicator for the messages available to the user.

Still further in accordance with the present invention, there is provided a method for enabling communal audio message recordal comprising the provision of audio data recordal means coupled with a communications system configured to enable multiple users to access the recordal means and to record respective audio messages thereby, wherein the recordal of each message further comprises: capture and storage of at least one qualifying parameter pertaining to the access to the recordal means; the determination of said qualifying parameter for a subsequent access to the recordal means by a user; and the enabling of access by said subsequently accessing user to previously recorded messages having a matching qualifying parameter, otherwise the denial of such access.

The qualifying parameter may comprise an indication of geographical location for a user recording a message, and for a user requesting playback of a message; it may comprise an indication of time and/or date for a user recording a message and for a user requesting playback of a message; or it may comprise a user-supplied indication of a personal characteristic, such as a pastime of the user. Where the qualifying parameter is to be user input, a menu selection means may be provided by operation of which a user is enabled to supply an indication of one from a plurality of menu-listed personal characteristics.

BRIEF DESCRIPTION OF THE DRAWINGS

Preferred embodiments of the invention will now be described, by way of example only, and with reference to the accompanying drawings, in which.

DETAILED DESCRIPTION OF THE PRESENTLY PREFERRED EMBODIMENT

Figure 1:
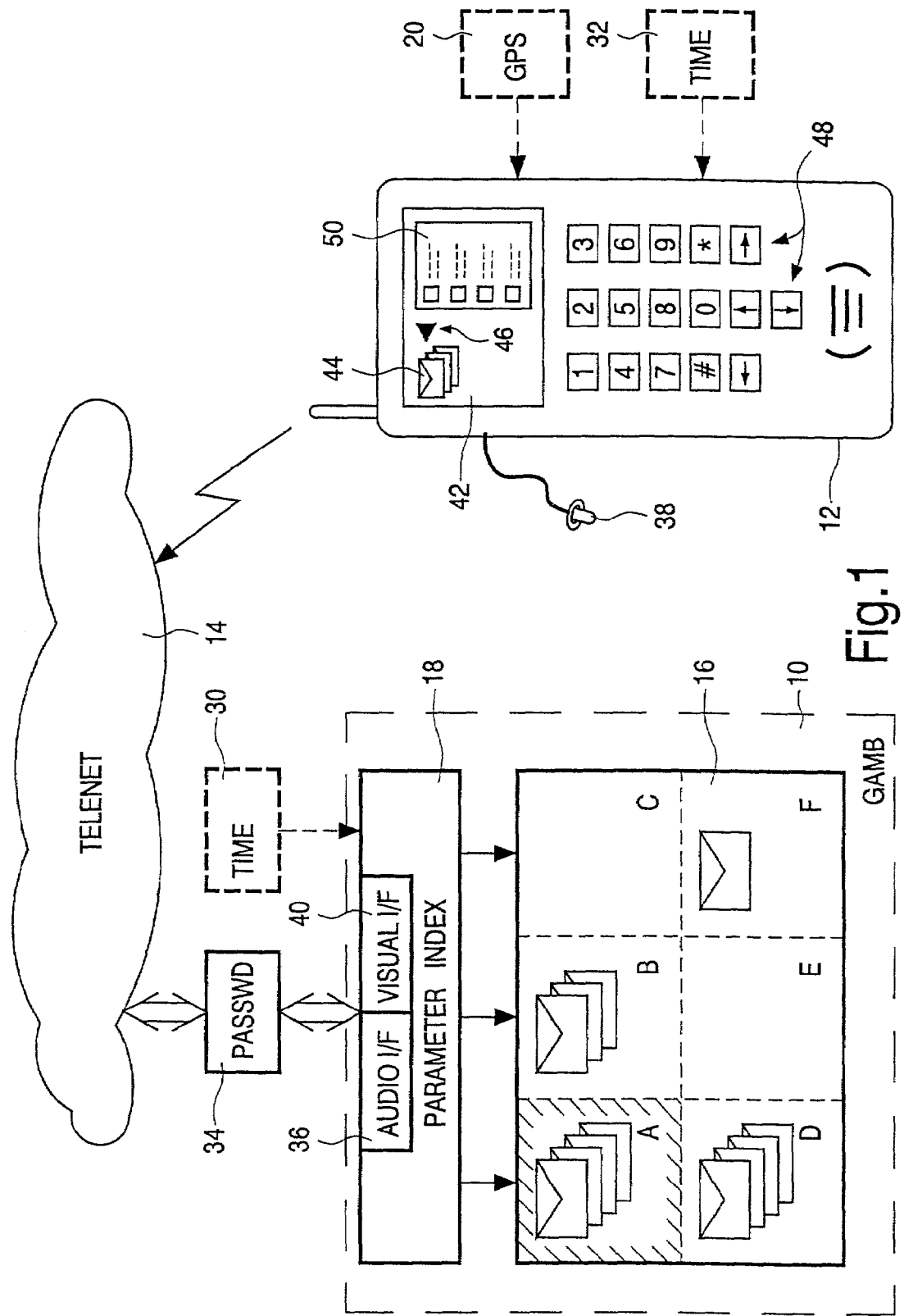
FIG. 1 is a block schematic diagram of a portable communications apparatus connecting to a group audio message board (GAMB)

Commencing with FIG. 1, a communal audio message recordal apparatus comprises a group audio message board (GAMB) 10 connected to receive audio messages input by a user via over a mobile telephone 12 and over a telecommunications network 14. The GAMB 10 comprises a storage device 16 which, from an operational perspective, is subdivided into a number of distinct areas A–F wherein are recorded audio messages in respective categories. The categories are determined by at least one qualifying parameter appended to each incoming message, which parameter is utilized by parameter index stage 18 to select the category storage area in the storage device 16 and record the message there.

The parameter index stage 18 further applies determination of the qualifying parameter for a subsequent access to the GAMB storage device 16 by a user seeking access to previously recorded messages, with the user only being granted access to messages having a matching qualifying parameter, otherwise being denied access. The qualifying parameter may take a number of forms, and may be determined automatically by the system, or may be at least partially under a users control, such that they can at least influence which of the storage areas or categories A–F they leave their messages in.

One suitable qualifying parameter is geographical location for the user: where the users mobile telephone 12 has a facility for determining its own location, as exemplified by Global Positioning System (GPS) unit 20, the location may be automatically or selectively appended to a message for recordal and to any further attempts to access stored messages. Dependent on the accuracy of the positioning system, and perhaps also on the character of the messages, a certain amount of geographic latitude may be permitted when making the comparison. A system administrator is supported by the system to monitor settings such as latitude to ensure that, for example, the geographical coverage area for a night-club (i.e., for visitors to the club to leave messages for one another) does not overlap the coverage area for a school.

Figure 2:
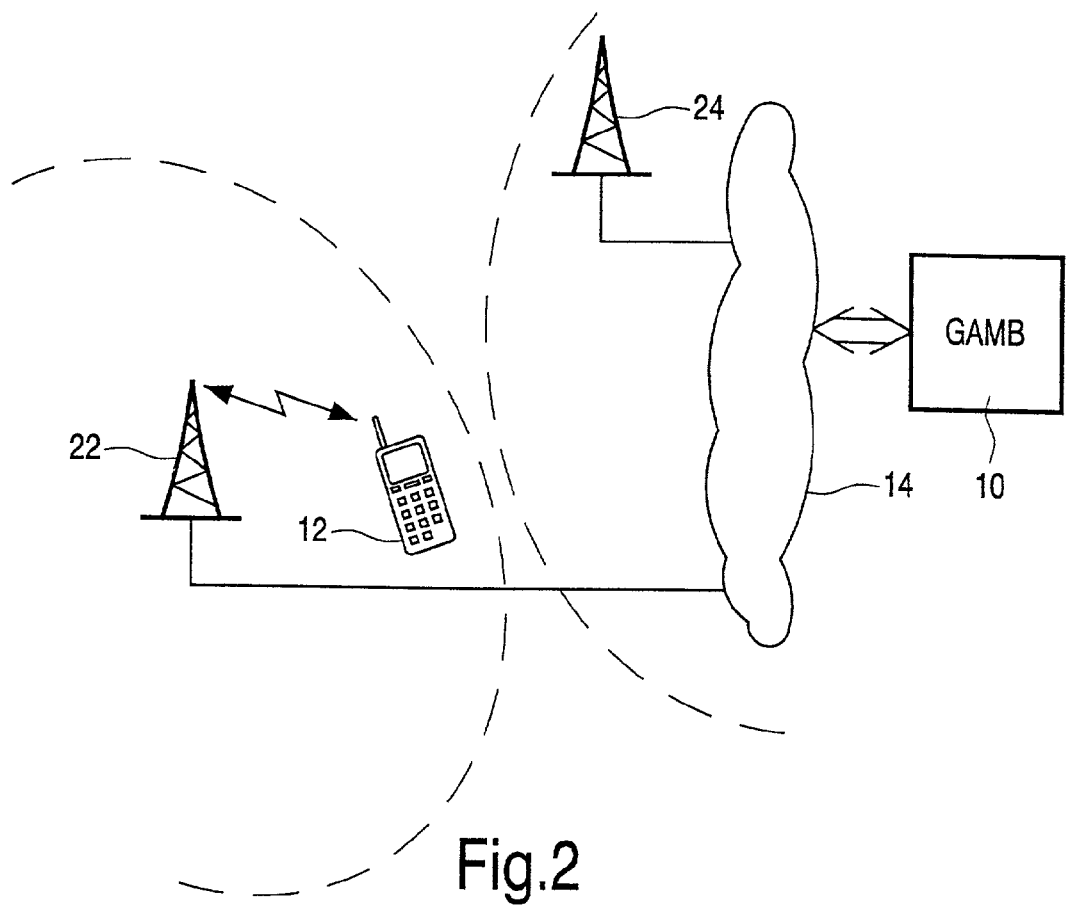
FIG. 2 represents a portable device connecting to the group audio message board via a system of networked beacons.

Referring now to FIG. 2, geographical restriction may be through the use of beacons 22, 24 in conjunction with the mobile telephone 12 and telecommunications network 14. With the mobile telephone 12 linking to the telecommunications network 14 via one of the beacons 22, an identifier for that beacon added to the recorded message provides the qualifying parameter. In a larger scale system, where there are a large number of networked beacons grouped into respective geographical clusters, each cluster may have its own identity which serves in place of a beacon identity for the geographical qualifying parameter.

Figure 3:
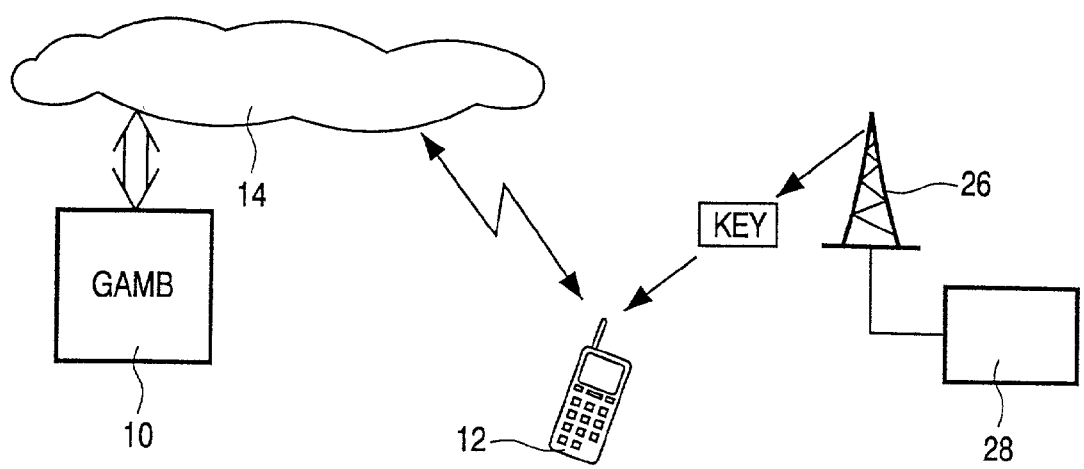
FIG. 3 represents a portable device obtaining access keys from a beacon for use with said group audio message board.

A variant on the beacon arrangement is shown in FIG. 3, wherein the mobile telephone 12 links direct to the telecommunications network 14: a beacon 26, driven from an independent source 28, makes available to the telephone 12 RF tokens or keys which serve to act as qualifying parameter when appended to a message. A system for the delivery of data keys or tokens via beacons is described in the commonly-assigned pending United Kingdom patent application no. 0015454.2. With this arrangement, the beacon 26 may be located at a sporting or entertainment venue, with the tokens or keys only being broadcast by the beacon during a given event, such that one area A–F of the GAMB storage device 16 (FIG. 1) is reserved to the exchange of messages by people who actually attended the event. One particular benefit to users is that, at least at first, the messages may be posted anonymously.

An alternative or additional qualifying parameter is restriction by time/date. Referring back to FIG. 1, a recordal time may be logged against messages stored, as indicated by clock source 30 coupled with the parameter indexing stage 18, and subsequent access is only enabled for a predetermined time thereafter. The addition of a time stamp is, in any event, a useful facility, in that it allows implementation of archiving and deletion procedures for the stored messages to ensure that only the most recent are kept generally available (access to archived messages may be restricted to a limited number of users, perhaps only system administrators). This may be replaced or supplemented by means (not shown) logging how many times each stored message is accessed, with unread messages being deleted. In combination with the time logging, an indication of the most popular logged messages may be discovered, with those messages of particular popularity being retained for longer than the average time before deletion/archiving, and the less popular messages being removed earlier.

Where the mobile telephone 12 is provided with a source 32 of date/time information, place/time qualifying parameters may be appended to audio messages identifying locations visited at a given time without requiring the beacon infrastructure of FIG. 2 or 3.

While the use of qualifying parameters provides restriction on access to stored messages, a further layer of security may be provided by a password access mechanism 34 requiring a user to input a predetermined password before permitting recordal of a message and/or access to stored messages.

To provide a user with an indication of the stored messages, the GAMB 10 may employ means for generating and providing, to a user seeking access to previously recorded messages, an audio indicator for the messages available to the user. This may be in the form of an audio interface stage 36 coupled with the parameter indexing stage 18, optionally using voice synthesis to generate audio identifiers for the stored messages to be delivered via an earpiece 38 or speaker (not shown) of the mobile telephone 12. Alternately, the audio interface stage 36 may be arranged to present identifiers in the form of playback for the first few seconds of each message.

Control of the audio playback may use a touch-tone control for the interface, similar to current automated ordering systems, for example presenting the following audio options to a user accessing messages for playback:

"Press 1 to hear the next main message"
"Press 2 to add a comment after the last message"
"Press 3 to add a new main message" and so forth.

In the alternative, or in addition to audio indexing, a visual index for the stored messages may be provided, under control of visual interface stage 40 coupled with the parameter indexing stage 18. In the example of FIG. 1, the user has accessed (to playback) GAMB storage section A, and on a display 42 on the telephone 12 there is presented an icon 44 indicating the number of messages available. A cursor 46 on the display, controlled by cursor keys 48 on the telephone keypad, enables the user to select one of the messages for playback. The icon 44 may include some further indication (such as date of recordal or a name left by the message leaving party) to enable the accessing user to distinguish between stored messages. This facility is of particular value where the order of the stored messages may vary: for example, the system may be arranged as described above to determine the popularity of messages, and availability might be restricted to the last ten or twenty (say) messages presented to the user in order of most to least popular.

Other variants for the qualifying parameter will suggest themselves to the skilled reader. For example, various forms of parameter code or data may be specifically input by a user via the controls of the portable communications device: this is of particular use where full alpha-numeric input is supported, for example by a communications-equipped PDA, or a WAP telephone. It should be noted that such user input parameter, for identifying where the message should be stored and hence who should have access to it, is distinct from the password access control by stage 34 which simply enables or disables access to the GAMB 10. An example of parameter code or data might be an indicator as to user jobs, pastimes, preferences, or other personal data of a user. To keep the number of difference message board areas A–F from proliferating excessively, a restriction on the number of different parameters may be imposed. One suitable method for this may be by requiring the user to select (again via cursor keys 48) an option from a menu of choices 50 displayed on the telephone display 42.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein.

The invention claimed is:

1. A method for enabling communal audio message recordal including a provision of audio data recorder coupled with a communications system configured to enable multiple users to access the audio data recorder and to record respective audio messages thereby, wherein a recordal of each message comprises:

generating and storing by said system at least one qualifying parameter pertaining to the access to the audio data recorder;

determining a qualifying parameter for a subsequent access to the audio data recorder by a user; and enabling access by said subsequently accessing user to previously recorded messages having a matching qualifying parameter, otherwise the denial of such access, wherein the qualifying parameter includes an indication of time and/or date for a user recording a message and for a user requesting playback of a message.

2. A method for enabling communal audio message recordal including a provision of audio data recorder coupled with a communications system configured to enable multiple users to access the audio data recorder and to record respective audio messages thereby, wherein a recordal of each message comprises:

generating and storing by said system at least one qualifying parameter pertaining to the access to the audio data recorder;

determining a qualifying parameter for a subsequent access to the audio data recorder by a user; and enabling access by said subsequently accessing user to previously recorded messages having a matching qualifying parameter, otherwise the denial of such access, wherein the qualifying parameter includes a user-supplied indication of a personal characteristic.

3. A method for enabling communal audio message recordal including a provision of audio data recorder coupled with a communications system configured to enable multiple users to access the audio data recorder and to record respective audio messages thereby, wherein a recordal of each message comprises:

generating and storing by said system at least one qualifying parameter pertaining to the access to the audio data recorder;

determining a qualifying parameter for a subsequent access to the audio data recorder by a user; and enabling access by said subsequently accessing user to previously recorded messages having a matching qualifying parameter, otherwise the denial of such access, wherein the qualifying parameter includes a user-supplied indication of a personal characteristic, wherein said personal characteristic is a pastime of the user.

4. A method for enabling communal audio message recordal including a provision of audio data recorder coupled with a communications system configured to enable multiple users to access the audio data recorder and to record respective audio messages thereby, wherein a recordal of each message comprises;

generating and storing by said system at least one qualifying parameter pertaining to the access to the audio data recorder;

determining a qualifying parameter for a subsequent access to the audio data recorder by a user; and enabling access by said subsequently accessing user to previously recorded messages having a matching qualifying parameter, otherwise the denial of such access, wherein the qualifying parameter includes a user-supplied indication of a personal characteristic, further comprising:

providing a menu selection by operation of which a user is enabled to supply an indication of one from a plurality of menu-listed personal characteristics.

5. A group audio message board, comprising:

a storage device; and a parameter index module, wherein said parameter index module is operable to store a first message having a first at least one qualifying parameter by said board appended to the first message within said storage device in response to a first user of said group audio message board communicating the first message to said group audio message board, the first at least one qualifying parameter for enabling an access to the first message by a second user of said group audio message board, wherein said parameter index module is further operable to enable access to the first message by the second user in response to the second user communicating the first at least one qualifying parameter to said group audio message board wherein the qualifying parameter includes a user-supplied indication of a personal characteristic wherein said parameter index module is further operable to store a second message having a second at least one qualifying parameter appended to the second message within said storage device in response to the first user communicating the first message to said group audio message board, the second at least one qualifying parameter for enabling an access to the second message by the second user; and wherein said parameter index module is further operable to enable access to the second message by the second user in response to the second user communicating the second at least one qualifying parameter to said group audio message board.

* * * * *